Jan. 8, 1952     J. T. CRONKHITE     2,582,105
DEVICE FOR SHUTTING OFF GASES FROM PIPE LINES
Filed Aug. 22, 1947     2 SHEETS—SHEET 1
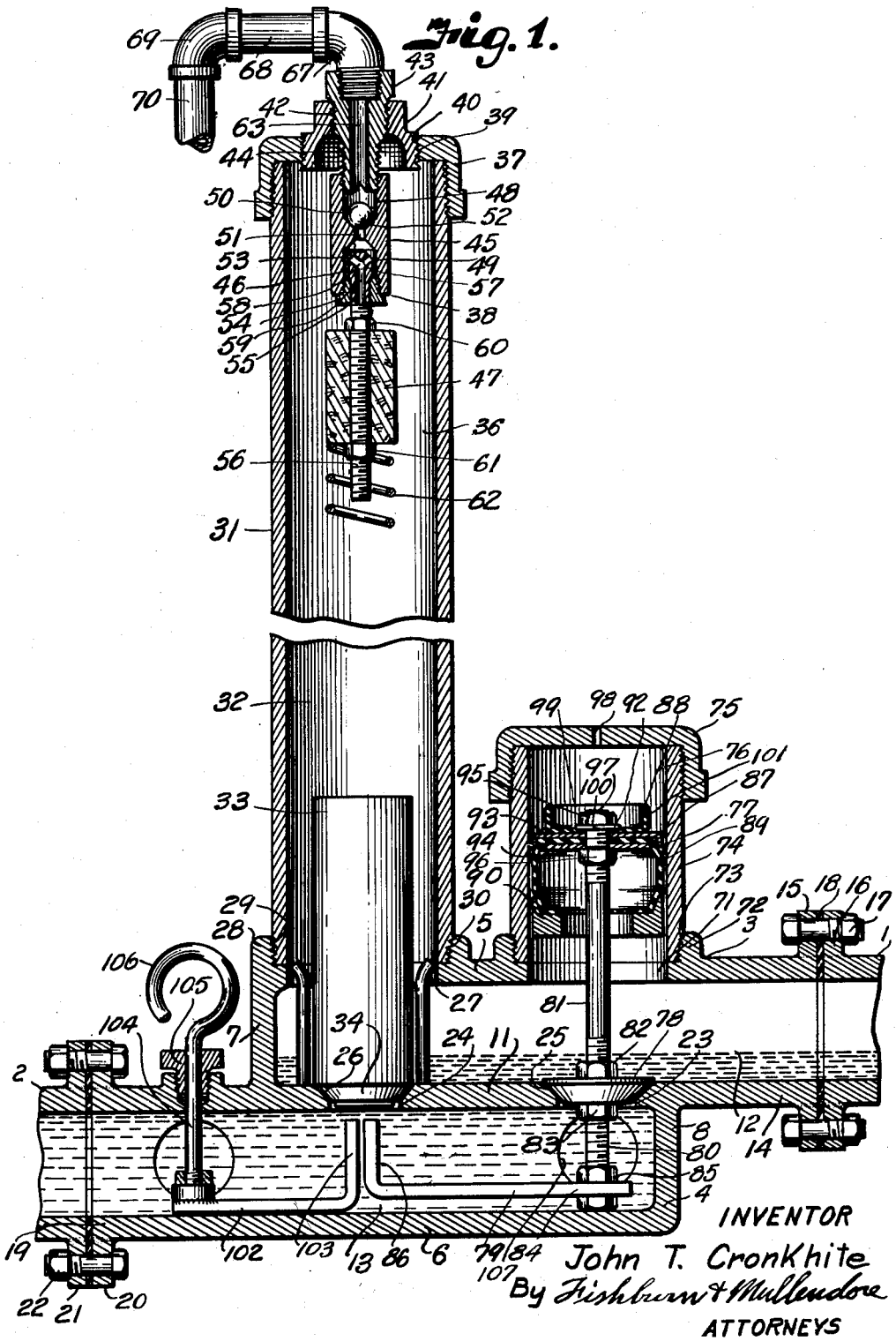

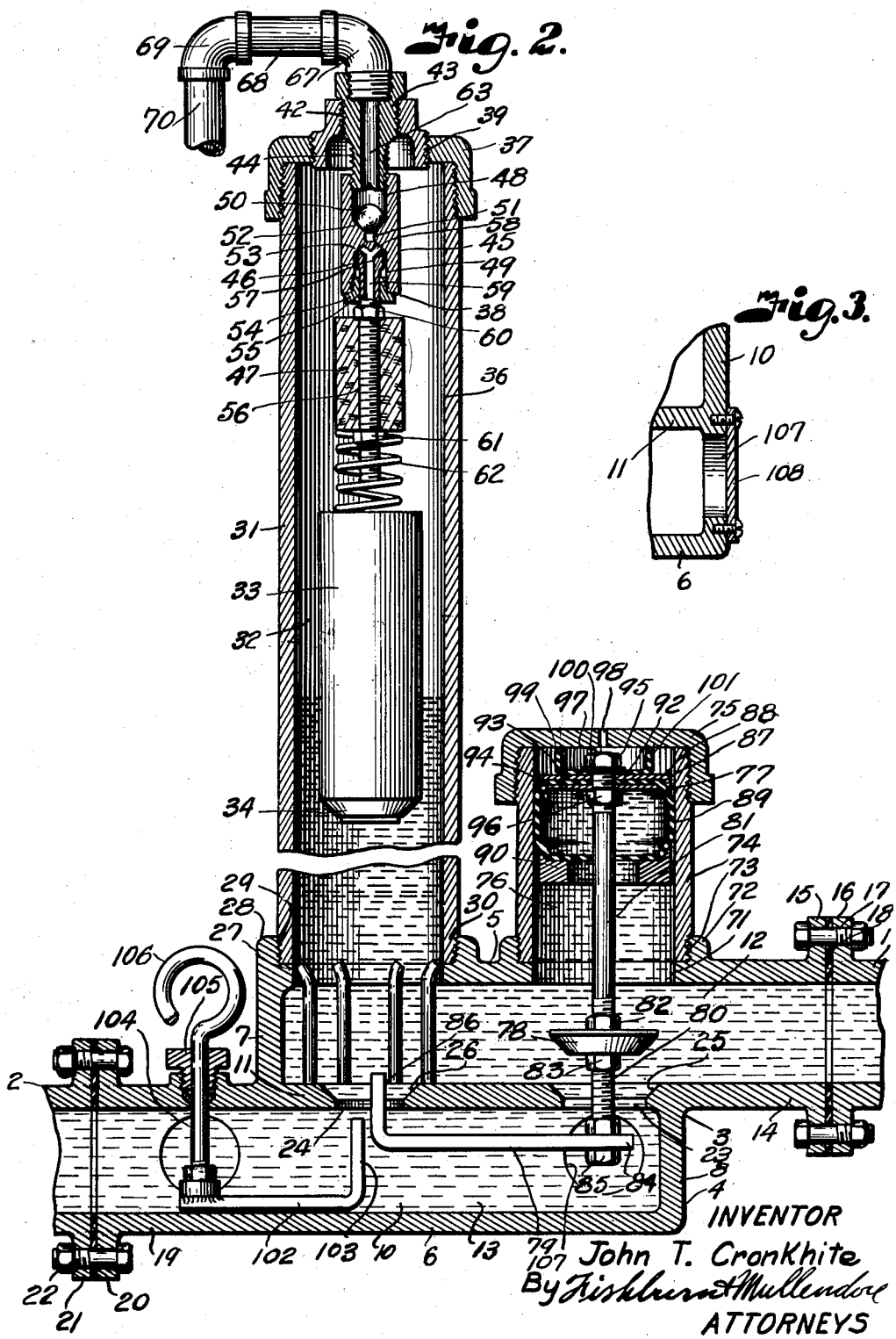

Patented Jan. 8, 1952

2,582,105

UNITED STATES PATENT OFFICE 2,582,105

DEVICE FOR SHUTTING OFF GASES FROM PIPE LINES

John T. Cronkhite, Tulsa, Okla.

Application August 22, 1947, Serial No. 770,052

11 Claims. (Cl. 137—68)

This invention relates to devices for shutting off gases from pipe lines, particularly the pipe line leading from a battery of field tanks in a petroleum producing area to the gathering pump supplying a main pipe line, the present invention being an improvement on the apparatus disclosed in Patent No. 2,210,751 issued to me August 6, 1940.

The shutoff device of the patent operates automatically to shut off flow when the tanks empty, thereby preventing air from being drawn into the gathering line, but it requires manual tripping of the valve when the flow is to be resumed. Therefore, the principal object of the present invention is to provide such a device with automatic tripping means so that when the head of a liquid again rises in the tank the flow to the gathering pump in automatically re-established.

Other objects of the invention are to provide an entirely automatic shutoff and flow control mechanism that is of simple construction, positive in operation and which is provided with dual outlets for discharge of liquid from the tank into the main line.

It is also an object of the invention to provide an automatic shutoff device with a manual trip means so that the float valving member may be unseated whenever it is desired to establish flow to the gathering pipe line independently of the automatic tripping means.

In accomplishing these and other objects of the invention, I have provided improved structure, the preferred form of which is illustrated in the accompanying drawing wherein:

Fig. 1 is a vertical section through an automatic shutoff and control device constructed in accordance with the present invention and showing the valving members in closed position to interrupt flow and prevent air from being drawn into the gathering line.

Fig. 2 is a similar view but showing the valving members in unseated position for establishing flow to the gathering pipe line.

Fig. 3 is a fragmentary section illustrating one of the openings and closure thereof through which access may be had to adjust the float valve lifting arms.

Referring more in detail to the drawings:

1 designates a portion of a pipe line through which a liquid petroleum is caused to flow by gravity from a field tank or a battery of tanks (not shown) to a gathering pipe line 2 which leads to the suction connection of a pump (not shown) by which the liquid is discharged under pressure to a pipe line leading to loading docks or other places of storage. Connected between the terminal end of the pipe line 1 and the inlet of the pipe line 2 is an automatic shutoff and control device 3 embodying the features of the present invention.

The device 3 includes a valve body 4 having a top 5, a bottom 6, end walls 7—8, side walls 10 and a partition 11 intermediate the top and bottom to form passageways 12 and 13.

The top 5 and partition 11, together with the side walls 10, project beyond the end wall 8 to form a neck 14 for connection with the pipe 1, for example, the neck and pipe may be provided with mating flanges 15 and 16 which are secured together by fastening devices such as bolts 17. If desired, a suitable gasket 18 or the like may be inserted between the flanges. Similar neck 19 is formed at the opposite end by extending the partition 11 and bottom 6 together with the side walls 10 and the neck 19 may be provided with a flange 20 that is connected with a similar flange 21 on the gathering line 2 by fastening devices such as bolts 22. The partition is provided at points intermediate the end walls 7 and 8 with ports 23 and 24 that are encircled by valve seats 25 and 26 through which flow connections are provided between the passageways 12 and 13. Formed in the top 5 in axial registry with the port 24 is an opening 27 encircled by outwardly offset flange 28 having internal threads 29. Turned into the threads and supported by the collar is the threaded end 30 of a cylindrical body 31 providing a substantially elongated chamber 32 for guiding a float 33. The float 33 preferably includes a cylindrical body having a seating face 34 on its lower end to engage the seat 26 and close flow through the port 24. The float is of a length to provide the desired buoyancy and extends upwardly through the opening 27 into the float chamber as shown in Fig. 1. The lower end of the float is guided for movement across the passageway 12 by fingers 35 that extend upwardly from the marginal edge of the seat 26 and curve inwardly toward the edge of the opening 27. The tubular body 31 may comprise a section of pipe and is of a length so that the float 33 may be entirely received therein to avoid blocking of flow through the passageway 12 when the float is unseated and also to provide a space 36 above the float when in unseated postion. The upper end of the tubular body is closed by a pipe cap or the like 37 that is threaded thereon as shown in Fig. 1.

When the float is in seated position as shown in Fig. 1, the port is closed to stop flow from the pipe 1 to the pipe 2, thereby preventing drawing of air into the pipe 2 when the tank or tanks run out of liquid. When the head of liquid is contained within the tanks and the float has been unseated, the float rises within the float chamber and the liquid flows from the pipe 1 through the passageway 12 and port 24 to the passageway 13 and pipe 2 as shown in Fig. 2.

The float in its uppermost position as shown in

Fig. 2 also controls a vent mechanism 38 as now to be described.

Formed in the cap 37 is an opening 39 having internal threads 40 for engaging the threads of a plug 41, the opening 39 being of a diameter to permit removal of the working parts of the venting mechanism upon removal of the plug as later described. Formed in the plug 41 is an internally threaded opening 42 and engaged therein is a fitting 43 that has a reduced threaded portion 44 extending into the space 35 and which supports a venting valve 45 through which air and gas entrapped within the space 36 is vented to atmosphere under control of a shutoff valve 46 that is actuated by the float 33 or a float 47 later described. The valve 45 includes axial bores 48 and 49 opening inwardly from the respective ends thereof to provide valve chambers for a ball check 50 and a shutoff valve member 46, the chambers being interconnected through a port 51. Encircling the port 51 on the respective sides thereof are seats 52 and 53 for the respective valving members. The ball valve is normally retained on its seat by gravity and is readily displaced by any pressure contained within the space 36 when the valve 46 is unseated. The lower end of the shutoff valve chamber is closed by a bushing 54 having an axial bore 55 forming a guide for a stem 56 that depends from the shutoff valve into the space 36 and mounts a float 47 thereon. The valve 46 is provided with a coned end 57 that is adapted to engage the seat 53 and which is provided with ports 58 that connect with an axial bore 59 extending downwardly through the valve stem and opening into the space 36 at the lower end thereof.

The portion of the valve stem mounting the float 47 is externally threaded to mount adjusting nuts 60 and 61 at the respective ends of the float to adjustably position the float for the different levels to be carried in the float chamber. Fixed to the lower end of the float is one end of a coil spring 62 that is adapted to be engaged by the float 33 when the float is in its upper most position as shown in Fig. 2. The fitting 42 has an axial bore 63 forming an outlet from the check valve chamber 48 and which is connected by an L 67 having a nipple 68 carrying downturned elbow 69 in which is threaded a relatively short pipe section 70 so as to provide a return bend and thereby prevent entrance of rain water into the float chamber.

When the float valve is in closed position, means must be provided for unseating the valve. In accordance with the present invention, both an automatic and manual means is provided as now to be described.

Formed in the top 5 in axial alignment with the port 23 is an opening 71 encircled by an offset annular flange 72 having internal threads 73 for mounting a nipple or relatively short pipe section 74 that has its opposite end closed by a pipe cap 75 that is preferably threaded onto the upper end of a nipple as shown in the drawings. The nipple thus provides a substantially cylindrical chamber 76 for containing an expandable piston 77 adapted to be actuated by hydrostatic head acting in the passageway 12 to unseat a valve 78 and actuate an arm 79 to effect unseating of the float valve 33.

The valve 78 and arm 79 are adjustably carried upon a threaded end 80 of a stem 81 which extends vertically across the passageway 12 with the lower end extending through the port 23 into the passageway 13 and its upper end extending into the piston chamber 76. The valve 78 is positioned on the stem within the passageway 12 by jam nuts 82 and 83 mounted on the threaded portion of the stem to engage the respective sides of the valve. The arm 79 is positioned within the passageway 13 and has an apertured end 84 secured on the terminal end of the stem by jam nuts 85. The opposite end of the arm extends laterally in the passageway 13 and terminates in a finger 86 which registers with the port 24 and is adapted to engage the float and effect rising of the float from its seat upon upward reciprocation of the valve stem under action of the piston. The piston 77 includes a bulb-like body 87 formed of relatively thin resilient material such as rubber and has a head portion 88 and a slightly outwardly bulging skirt portion 89 positioned in close proximity to the inner wall of the cylinder when the valve is in closed position as shown in Fig. 1. The lower end of the skirt portion of the bulb carries a ring-shaped weight 90 to which an inturned portion of the skirt is attached in any suitable manner and which encircles the valve stem to provide ample passageway for flow of liquid into the internal portion of the piston as shown in Fig. 2. The head 88 has an aperture 92 and is clampingly supported between washers 93 and 94 carried between jam nuts 95 and 96 on a threaded terminal 97 of the valve stem.

In order to vent the piston chamber the cap 75 is provided with an axial opening 98 through which air is adapted to be vented when the piston moves in an upward direction and to admit air when the piston moves in a downward direction to effect closure of the valve 78. In order to seal the vent 95 when the piston is in its upper position, the head of the piston carries a cup-shaped sealing member 99 that is clamped between the upper washer 93 and a washer 100 against which the nut 95 is seated. The cup has a resilient annular flange 101 which engages the inner face of the cap in encircling relation with the opening 98 when the piston is in its uppermost position as shown in Fig. 2.

When the liquid discharges from the interior of the piston 77, the weight 90 is sufficient to straighten the skirt portion 89 sufficiently to permit fall of the piston under its own weight supplemented by the weight of the valve stem 81 and parts carried thereby so as to effect seating of the valve as now to be described.

At times it may be desirable to effect manual unseating of the float valve 33. This may be effected by providing an arm 102 similar to the arm 79 and which has a finger 103 adapted to extend alongside the finger 86 so that it may be projected through the port 24 upon lifting of a rod 104 to which the arm is attached. The rod 104 extends through a suitable packing gland 105 in the neck 19 and has a suitable handle 106 by which it may be grasped to raise the rod. In order to permit connection and adjustment of the arms 79 and 102, the sides of the valve casing may be provided with ports 107 that are closed by plates 108 as shown in Fig. 3.

Assuming that the device is constructed and assembled as described and that it is connected between the pipe lines 1 and 2 as shown in the drawings, when the tanks are emptied of liquid, the valve 78 and float valve 33 will be seated since the liquid in the passageway 12 is not of sufficient height to reach the piston 77. Therefore, air cannot be drawn through the tanks into the pipe line 2 and any gas pressure tending to accumulate in the tank will be vented through the float chamber 32, the bore 55 of the valve stem 62, port 51, and bore 63 to atmosphere. Upon inlet of liquid through the pipe 1, the liquid may tend to foam and the foam will push upwardly within the float chamber but very little foam can pass into the relatively small inlet of the bore 55 of the valve stem 56. The foam will, therefore, be trapped within the space at the top of the float chamber and be compressed by the liquid rising therein. As the head of liquid rises it enters the piston chamber 76 and passes through the opening of the ring-shaped weight 90 into the bulb-like body of the piston so that the pressure acts against the circumferential skirt 89 thereof to effect a sufficient seal between the piston and cylinder 74 for the rising hydrostatic head to move the piston upwardly within its cylinder and thereby unseat the valve 78. This movement also brings the finger 86 on the arm 79 into contact with the float 33 to lift and unseat the float from closing relation with the port 24. This is readily effected because the valve 78 in unseating effects substantial equalization in pressures between the passageways 12 and 13. As the liquid continues to rise, the sealing cup 99 on the head of the piston engages the cap 75 to seal around the vent opening 98 and the float contacts the end of the spring 62 to effect movement of the valve 46 into engagement with its seat 53 to close the port 51. The liquid then flows through both ports 23 and 24 into the passageway 13 and into the pipe 2 under suction of the gathering pump (not shown). In case the flow should be interrupted in the pipe 1 as when the tank nears emptiness, the liquid will flow out of the piston 77 so that the weight 90 is effective in permitting the valve 78 to drop to seated position which moves the finger 86 out of the port 24. The liquid, however, will continue to flow through the port 24 until the head of liquid in the float chamber drops to the point where the float valve 33 seats and closes the port 24. This will be effected before the liquid seal is broken to the line 2. Therefore, air and gas that may accumulate in the tank cannot be discharged with the liquid into the gathering line to interfere with operation of the pump or other equipment in the gathering system. Any air resulting from filling of the tank or evaporation of liquid will pass into the float chamber and move upwardly and discharge through the bore of the valve stem 56.

Should a large quantity of light foamy liquid be discharged through the pipe 1 before the float valve is unseated by the automatic unseating mechanism, the float 47 will be effective to cause closing of the port 51 so that light liquid is prevented from being discharged by way of the vent mechanism. If for any reason it becomes desirable to manually unseat the float 33, this may be effected by grasping the handle 106 and lifting the rod 104 which raises the arm 102 to bring the finger thereon into engagement with the float and effecting unseating of the float valve 33 independently of the automatic mechanism.

From the foregoing it is obvious that I have provided a device for venting air and gas from a liquid flow system and which prevents air and gas from entering the lines of a gathering system. It is also obvious that I have provided a simple and inexpensive construction which is adapted for entirely automatic operation to assure discharge of the liquid when a hydrostatic head accumulates in the field tank or tanks and which functions automatically to shut off the inlet to the gathering line when the liquid is emptied.

What I claim and desire to secure by Letters Patent is:

1. In combination with liquid supplying and gathering pipe lines, a flow connection between said pipe lines, means in said connection for automatically shutting off flow of liquid responsive to lack of liquid in the supply line, and separate means responsive to liquid in the supply line and carrying a lifting portion engageable with said shut-off means for automatically opening the shutoff means to establish flow of liquid from the supply line to the gathering line.

2. In combination with liquid supplying and gathering pipe lines, a flow connection between said pipe lines, float means in said connection for automatically shutting off flow of liquid responsive to lack of liquid in the supply line, and means responsive to liquid in the supply line and carrying a lifting portion engageable with said float means for automatically raising the float means to establish flow of liquid from the supply line to the gathering line.

3. An apparatus of the character described including a valve casing having a flow passageway adapted for connection to a liquid supply line and a flow passageway adapted to be connected with a gathering line, said flow passageways being interconnected by a port in said casing, a riser pipe connected with the valve casing and having connection with the first named flow passageway in axial alignment with said port, a float valve movable in the riser pipe upon flow of liquid into the riser pipe from said passageway and adapted to close said port upon discharge of liquid from the riser pipe, float unseating means connected with the valve casinug and responsive to presence of liquid in said first named passageway, and means carried by the float unseating means and engageable with the float valve for automatically unseating the float valve.

4. An apparatus of the character described including a valve casing having a flow passageway adapted for connection to a liquid supply line and a flow passageway adapted to be connected with a gathering line, said flow passageways being interconnected by a port in said casing, a riser pipe connected with the valve casing and having connection with the first named flow passageway in axial alignment with said port, a float valuve movable in the riser pipe upon flow of liquid into the riser pipe from said passageway and adapted to close said port upon discharge of liquid from the riser pipe, a piston cylinder carried by the valve casing, a piston slidable in the cylinder responsive to pressure of the liquid in said supply line, and means connected with the piston for unseating said float valve.

5. An apparatus of the character described including a valve casing having a flow passageway adapted for connection to a liquid supply line and a flow passageway adapted to be connected with a gathering line, said flow passageway being interconnected by a port in said casing, a riser pipe connected with the valve casing and having connection with the first named flow passageway in axial alignment with said port, a float valve movable in the riser pipe upon flow of liquid into the riser pipe from said passageway and adapted to close said port upon discharge of liquid from the riser pipe, a piston cylinder carried by the valve casing, a piston slidable in the cylinder and having an expandable portion movable into contact with the cylinder under hydrostatic pressure of liquid in said supply line, and means connected with the piston for unseating said float valve.

6. An apparatus of the character described including a valve casing having a flow passageway adapted for connection to a liquid supply line and a flow passageway adapted to be connected with a gathering line, said flow passageway being interconnected by a port in said casing, a riser pipe connected with the valve casing and having connection with the first named flow pasageway in axial alignment with said port, a float valve movable in the riser pipe upon flow of liquid into the riser pipe from said passageway and adapted to close said port upon discharge of liquid from the riser pipe, a piston cylinder carried by the valve casing, a piston slidable in the cylinder, hydrostatic pressure of liquid in said supply line, said casing having a port connecting the passageways in coaxial alignment with the cylinder, a rod connected with the piston and extending through said last named port, a valve on the rod for closing said last named port, and means on the end of the rod for engaging the float valve to unseat the float valve upon upward movement of the piston.

7. An apparatus of the character described including a valve casing having a flow passageway adapted for connection to a liquid supply line and a flow passageway adapted to be connected with a gathering line, said flow passageway being interconnected by a port in said casing, a riser pipe connected with the valve casing and having connection with the first named flow passageway in axial alignment with said port, a float valve movable in the riser pipe upon flow of liquid into the riser pipe from said passageway and adapted to close said port upon discharge of liquid from the riser pipe, a piston cylinder carried by the valve casing, a piston slidable in the cylinder and having an expandable portion movable into contact with the cylinder under hydrostatic pressure of liquid in said supply line, said casing having a port connecting the passageway in coaxial alignment with the cylinder, a rod connected with the piston and extending through said last named port, a valve on the rod for closing said last named port, and means on the end of the rod for engaging the float valve to unseat the float valve upon forward movement of the piston.

8. An apparatus of the character described including a valve casing having a flow passageway adapted for connection to a liquid supply line and a flow passageway adapted to be connected with a gathering line, said flow passageway being interconnected by a port in said casing, a riser pipe connected with the valve casing and having connection with the first named flow passageway in axial alignment with said port, a float valve movable in the riser pipe upon flow of liquid into the riser pipe from said passageway and adapted to close said port upon discharge of liquid from the riser pipe, a piston cylinder carried by the valve casing, a piston slidable in the cylinder and having an expandable portion movable into contact with the cylinder under hydrostatic pressure of liquid in said supply line, said casing having a port connecting the passageway in coaxial alignment with the cylinder, a rod connected with the piston and extending through said last named port, a valve on the rod for closing said last named port, means on the end of the rod for engaging the float valve to unseat the float valve upon upward movement of the piston, and separate means for manually unseating the float.

9. An apparatus of the character described including a valve casing having a flow passageway adapted for connection to a liquid supply line and a flow passageway adapted to be connected with a gathering line, said flow passageway being interconnected by a port in said casing, a riser pipe connected with the valve casing and having connection with the first named flow passageway in axial alignment with said port, a float valve movable in the riser pipe upon flow of liquid into the riser pipe from said passageway and adapted to close said port upon discharge of liquid from the riser pipe, valve means for venting the riser pipe and operable responsive to movement of the float valve, a piston cylinder carried by the valve casing and having a vent port, a piston slidable in the cylinder and having an expandable portion movable into contact with the cylinder under hydrostatic pressure of liquid in said supply line, said casing having a port connecting the passageway in coaxial alignment with the cylinder, a rod connected with the piston and extending through said port, a valve on the rod for closing said port, and means on the end of the rod for engaging the float valve to unseat the float valve upon upward movement of the piston.

10. An apparatus of the character described including a valve casing having a flow passageway adapted for connection to a liquid supply line and a flow passageway adapted to be connected with a gathering line, said flow passageway being interconnected by a pair of ports in said casing, a riser pipe connected with the valve casing and having connection with the first named flow passageway in axial alignment with one of said ports, a float valve movable in the riser pipe upon flow of liquid into the riser pipe from said passageway and adapted to close said last mentioned port upon discharge of liquid from the riser pipe, valve means for venting the riser pipe and operable responsive to movement of the float valve, a piston cylinder carried by the valve casing and having a vent port, a piston slidable in the cylinder and having an expandable portion movable into contact with the cylinder under hydrostatic pressure of liquid in said supply line, a valve connected with the piston for controlling the other of said ports, means carried by said valve and engageable with the float valve for unseating the float valve, and means on the piston for sealing the vent port of the cylinder in one position of the piston.

11. An apparatus of the character described including a valve casing having dual ports, a float valve controlling one of said ports, a pressure actuated valve controlling the other port, and means carried by the pressure actuated valve to unseat the float valve.

JOHN T. CRONKHITE.

REFERENCES CITED

The following references are of record in the file of this patent:

UNITED STATES PATENTS

| Number | Name | Date |
|---|---|---|
| 1,556,760 | Conrader | Oct. 13, 1925 |
| 2,045,909 | Haralson | June 30, 1936 |
| 2,210,751 | Cronkhite | Aug. 6, 1940 |
| 2,216,296 | Raymond | Oct. 1, 1940 |
| 2,239,590 | Class | Apr. 22, 1941 |
| 2,322,304 | Montgomery | June 22, 1943 |
| 2,496,518 | Candler | Feb. 7, 1950 |